United States Patent
Huh et al.

(10) Patent No.: US 7,478,412 B2
(45) Date of Patent: Jan. 13, 2009

(54) CLAMPER AND DISK DRIVE WITH THE SAME

(75) Inventors: Young-woo Huh, Suwon-si (KR); Pil-je Cho, Yongin-si (KR); Young-sun Jung, Suwon-si (KR); Kyu-hyeong Lee, Suwon-si (KR); Sung-huh Lee, Suwon-si (KR); Chung-ung Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 363 days.

(21) Appl. No.: 11/083,339

(22) Filed: Mar. 18, 2005

(65) Prior Publication Data
US 2005/0246727 A1 Nov. 3, 2005

(30) Foreign Application Priority Data
Mar. 18, 2004 (KR) .................... 10-2004-0018287

(51) Int. Cl.
*G11B 17/028* (2006.01)
(52) U.S. Cl. ...................... 720/706; 720/604
(58) Field of Classification Search ............. 720/604, 720/605, 706, 710
See application file for complete search history.

(56) References Cited

U.S. PATENT DOCUMENTS 4,829,501 A    5/1989    Seto et al.
5,757,762 A *  5/1998    Lee ........................ 720/705
6,941,570 B2 * 9/2005    Kim ........................ 720/709
2003/0147337 A1* 8/2003  Kim ........................ 369/270
2004/0268377 A1* 12/2004 Azai ....................... 720/710

FOREIGN PATENT DOCUMENTS

| JP | 07-114761 | 5/1995 |
|---|---|---|
| JP | 8-235709 | 9/1996 |
| JP | 09-091812 | 4/1997 |
| JP | 10-003718 | 1/1998 |
| JP | 11306626 A * | 11/1999 |
| JP | 2003228971 A * | 8/2003 |
| JP | 2004178689 A * | 6/2004 |
| KR | 2001-0058394 | 7/2001 |
| KR | 2003-0067164 | 8/2003 |

* cited by examiner

*Primary Examiner*—William J Klimowicz
(74) *Attorney, Agent, or Firm*—Staas & Halsey LLP

(57) ABSTRACT

A damper and a disk drive using the clamper. The damper includes a body, a movable member inserted into a guide portion protruding from a center of the body so that the movable member is moved up and down along the guide portion, and having a plurality of opposed bosses, an elastic member, inserted into the guide portion under the movable member, for elastically biasing the movable member upward, and a stationary member, installed on an upper portion of the guide portion, for preventing the movable member from being released from the guide portion.

16 Claims, 8 Drawing Sheets

CLAMPER AND DISK DRIVE WITH THE SAME

CROSS-REFERENCE TO RELATED APPLICATION

This application claims the priority of Korean Patent Application No. 2004-18287, filed on Mar. 18, 2004, in the Korean Intellectual Property Office, the disclosure of which is incorporated herein in its entirety by reference.

BACKGROUND OF THE INVENTION

1. Field of the Invention

The present invention relates to a disk drive, and more particularly, to a clamper for securing a data storage disk to a turntable.

2. Description of the Related Art

A disk drive is an apparatus to read data from and/or write data to a disk-type optical medium (hereinafter referred to as an optical disk), such as compact disk (CD), digital video disk (DVD), or the like, by irradiating a light onto the optical disk.

FIG. 1A is a partial cross-sectional view illustrating one example of a conventional clamper, and FIG. 1B is a partial cross-sectional view illustrating a disk clamped to a turntable by the damper shown in FIG. 1A.

Referring to FIG. 1A, a damper 20 is supported on a support frame 11 protruded downwardly along an edge of an opening formed at an upper case 10. A cover 13 is placed on the opening of the upper case 10 to close the opening. The damper 20 is arranged in such a manner that it can move up and down within a space 30 defined by the opening.

The cover 13 is provided under a bottom thereof with a damper 23 for preventing the clamper 20 from being raised and colliding against the cover 13 and absorbing a shock. The damper 23 is spaced apart from the damper 20 at a given distance.

Referring to FIG. 1B, when a turntable 14 with a disk D seated thereon approaches the clamper 20, a magnet 15 provided inside of the turntable 14 is magnetically adhered to a bracket 21 provided inside of the clamper 20, such that the disk D is secured between the clamper 20 and the turntable 14. The turntable 14 is turned by a spindle motor 16.

While the clamper 20 is moved upward by the turntable 14, the clamper 20 is spaced apart from the support frame 11 at a desired distance. Consequently, the clamper 20 is closer to the damper 23 relative to the spacing shown in FIG. 1A.

It is very difficult to set and maintain a spacing between the clamper 20 and the damper 23. Specifically, according to tests, when turntable 14 receives a shock, the clamper 20 does not stably operate, unless spaced apart from the damper 23. These tests included an operating shock test and a non-operating shock test. Consequently, it was determined that the damper 23 does not effectively prevent the clamper 20 from being spaced apart from the turntable 14 when an external shock is applied to the turntable 14, which can cause the disk to release from the turntable.

FIG. 2A is a partial cross-sectional view illustrating another example of a conventional clamper, and FIG. 2B is a partial cross-sectional view illustrating a disk clamped to a turntable by the clamper shown in FIG. 2A.

Referring to FIGS. 2A and 2B, a clamper 40 is provided on an upper surface thereof with a damper 43 and below there is a magnet 41. Since the cover 13 provided on the upper case 10 is made of a soft material, the cover 13 restricts the distance by which the clamper 40 moves upward in cooperation with the damper 43.

The shock tests (operating and non-operating) revealed that the clamper 40 and damper 43 were spaced apart from each other in a similar manner as discussed with respect to the structure of FIGS. 1A and 1B.

Furthermore, since the cover 13 is made of the soft material, the cover is easily affected by a force exerted from the outside, which prevents a smooth operation of the clamper 40.

SUMMARY OF THE INVENTION

Accordingly, it is an aspect of the present invention to provide a clamper for a disk drive, by which an engagement between the damper and a turntable is maintained even though an external shock is applied to the turntable, thereby preventing a disk from being released from the turntable.

It is another aspect of the present invention to provide a hard disk with the above clamper.

Additional aspects and/or advantages of the invention will be set forth in part in the description which follows and, in part, will be obvious from the description, or may be learned by practice of the invention.

According to an aspect of the present invention, there is provided a clamper to secure a disk in a disk drive, including an upper case, a support frame to support the clamper and provided under the upper case to move up and down, and a turntable coupled to the clamper, the clamper including: a body; a guide portion protruding from a center of the body; a movable member inserted into the guide portion protruded from the center of the body so that the movable member is moved up and down along the guide portion, and having a plurality of opposed bosses; an elastic member, inserted into the guide portion under the movable member, for elastically biasing the movable member upward; and a stationary member, installed on an upper portion of the guide portion, to prevent the movable member from being released from the guide portion.

BRIEF DESCRIPTION OF THE DRAWINGS

The above and/or other aspects and advantages of the present invention will become more apparent by describing in detail exemplary embodiments thereof with reference to the attached drawings in which.

DETAILED DESCRIPTION OF THE PREFERRED EMBODIMENTS

Figure 1A:
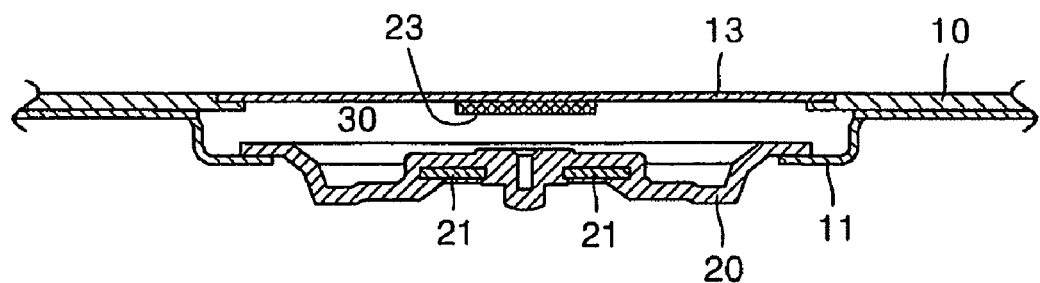
FIG. 1A is a partial cross-sectional view illustrating one example of a conventional clamper.
Figure 1B:
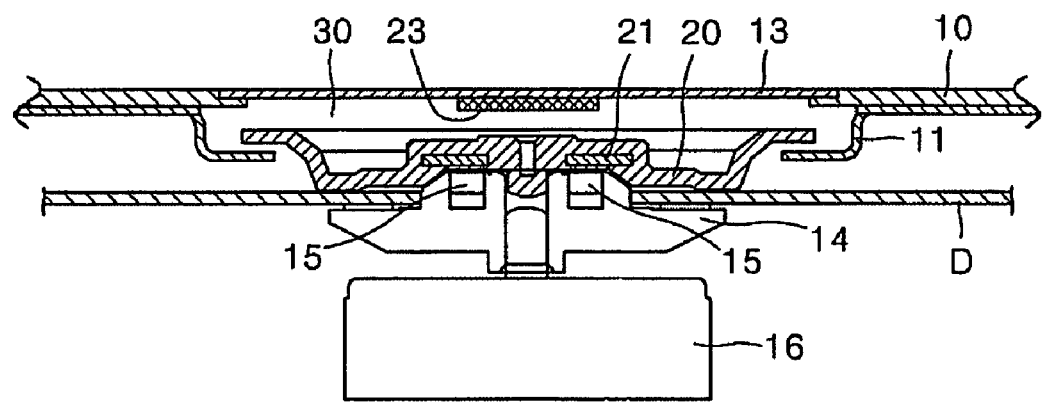
FIG. 1B is a partial cross-sectional view illustrating a disk clamped to a turntable by the clamper shown in FIG. 1A.
Figure 2A:
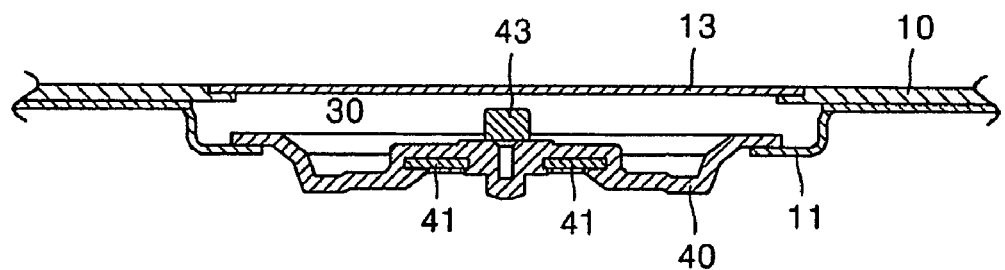
FIG. 2A is a partial cross-sectional view illustrating another example of a conventional clamper.
Figure 2B:
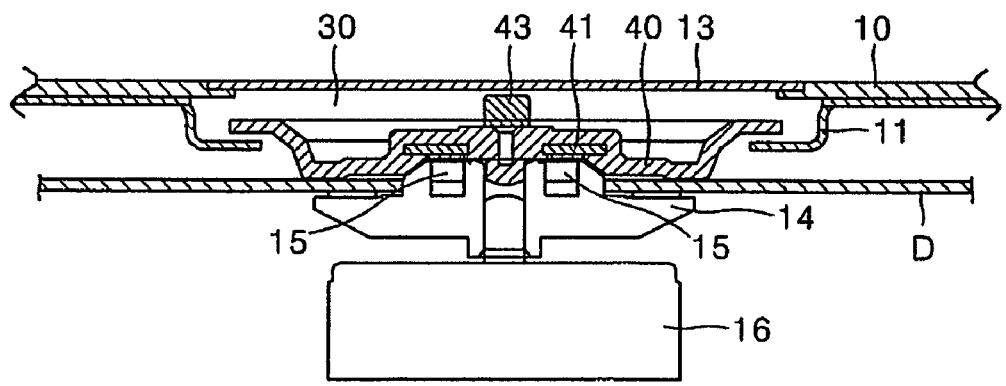
FIG. 2B is a partial cross-sectional view illustrating a disk clamped to a turntable by the clamper shown in FIG. 2A.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
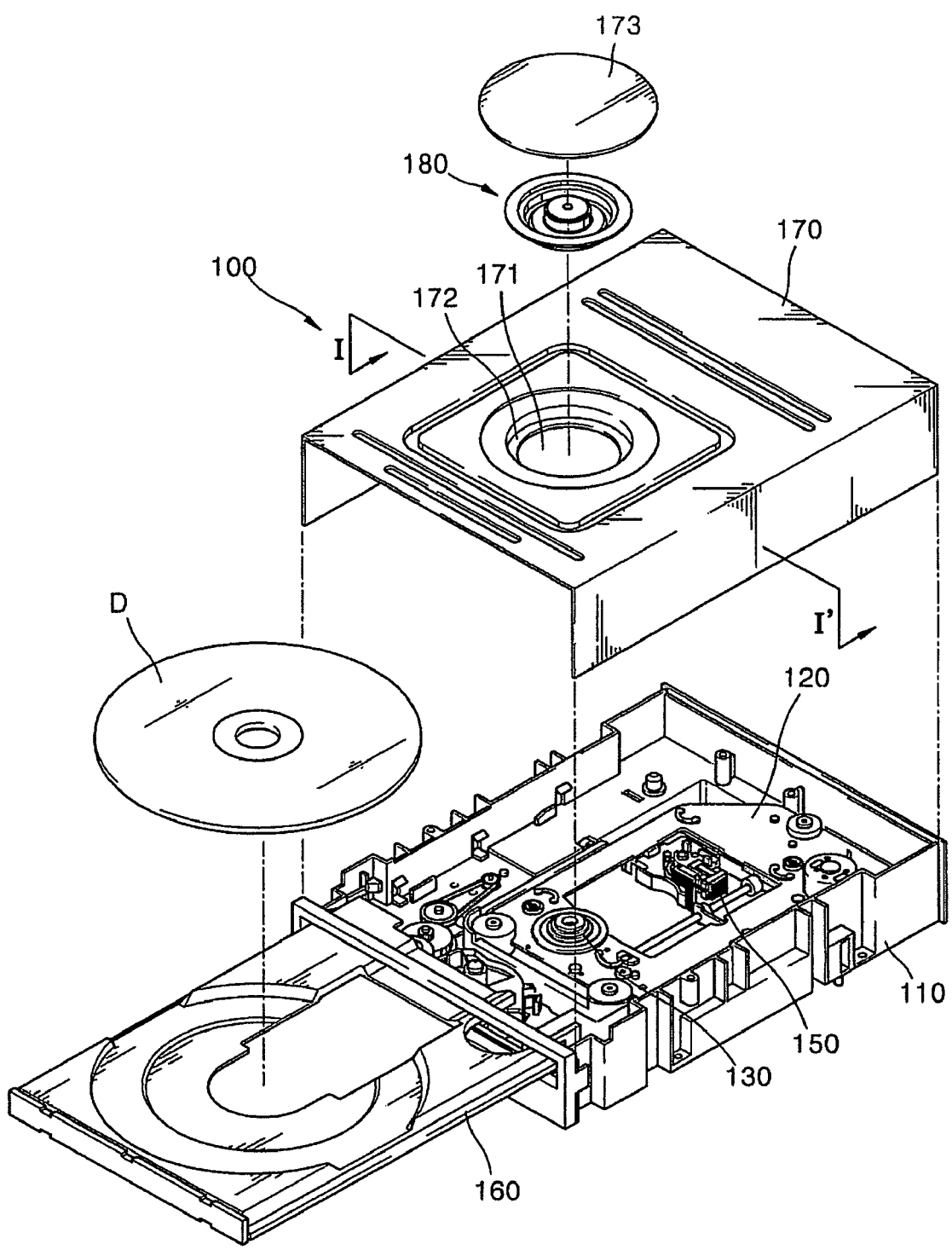
FIG. 3 is an exploded perspective view illustrating a construction of a disk drive to which embodiments of the present invention may be applied.
Figure 4:
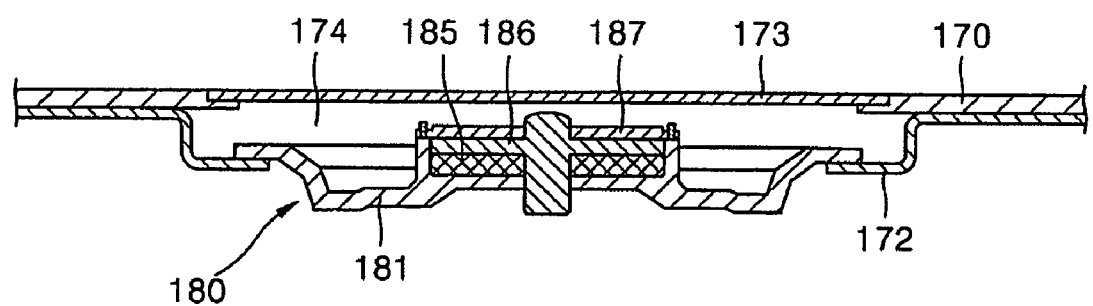
FIG. 4 is a cross-sectional view taken along a line I-I' in FIG. 3, which shows a clamper according to the first embodiment of the present invention.

Referring to FIGS. 3 and 4, a disk drive, generally indicated by 100, includes a main frame 110, a tray 160 movable relative to the main frame 110 and having a disk D mounted thereon, and an upper case 170 installed on an upper portion of the main frame 110 to enclose the main frame 110.

A sub-chassis 120 is installed to the main frame 110 so that it can pivot vertically. The sub-chassis 120 includes a turntable 130 to which the disk D can be mounted thereon, a spindle motor 140 (see FIGS. 6 and 8) coaxially installed on the turntable 130 for turning the turntable 130, and an optical pickup unit 150 reciprocating in a radial direction of the disk D for reading data from the disk or writing the data on the disk.

The upper case 170 is provided with a clamper 180 for securing the disk D, which is inserted into the main frame 110 by the tray 160, to the turntable 130.

The upper case 170 is formed with an opening 171 at a center thereof. A support frame 172 is protruded downwardly from a bottom of the upper case 170 along an edge of the opening 171. The clamper 180 is inserted into the opening 171, and is supported by the support frame 172. An upper portion of the opening 171 is closed by a cover 173 made of a solid material, such that a desired space 174 is formed between the support frame 172 and the cover 173. Consequently, the clamper 180 can be moved up and down within the space 174.

Figure 5:
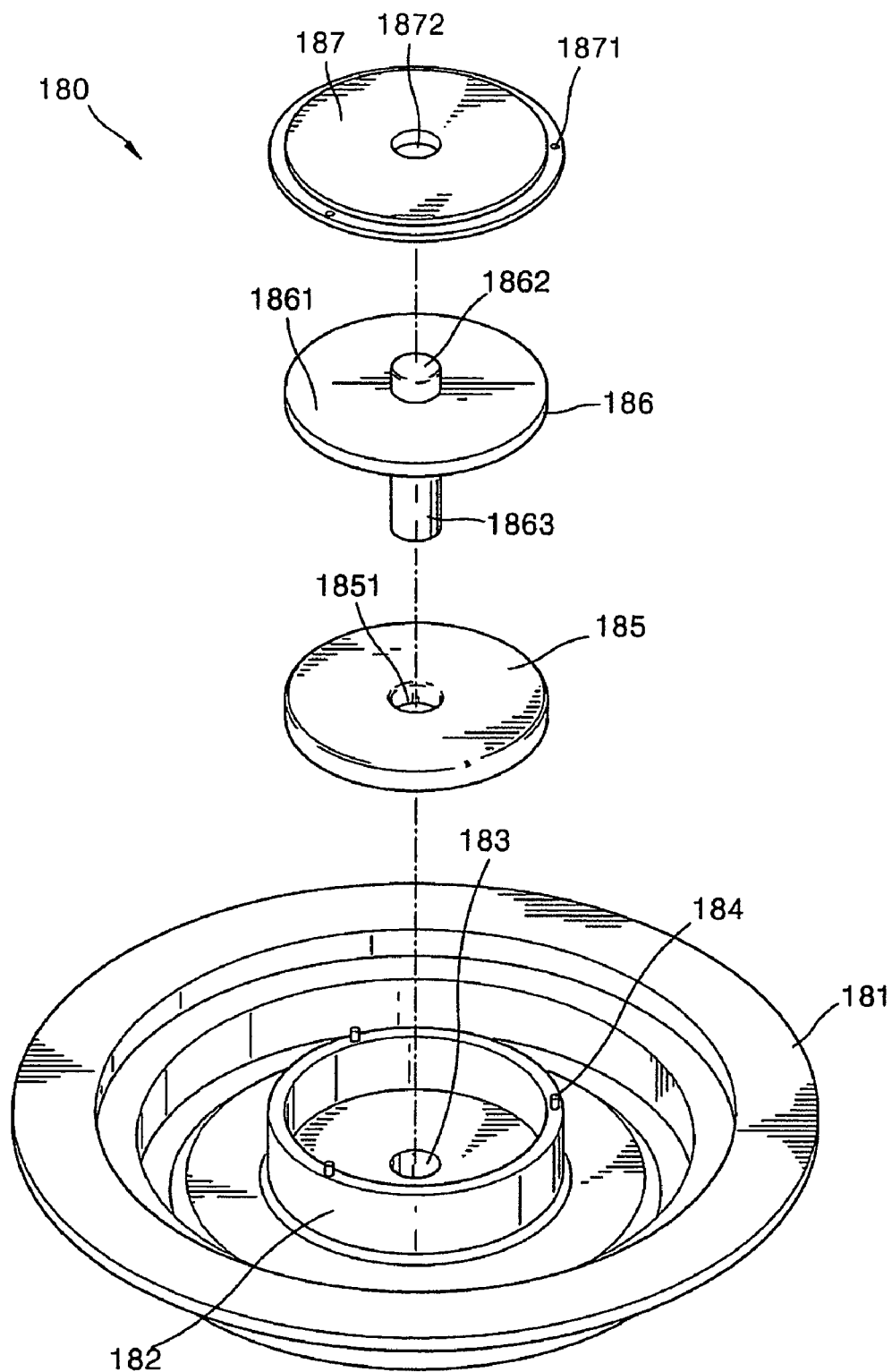
FIG. 5 is an exploded perspective view illustrating the clamper according to the first embodiment of the present invention.

Referring to FIGS. 4 and 5, the clamper 180 includes a body 181, an elastic member 185, a movable member 186, and a stationary member 187.

The body 181 is formed with a through hole 183 at a center thereof, and has a hollow guide portion 182 protruded from a bottom of the body around the through hole 183 at a desired height. The guide portion 182 is provided on an upper surface thereof with a plurality of stoppers 184 at regular intervals.

The movable member 186 is inserted into the guide portion 182 so that it can be moved up and down along the guide portion 182. The movable member 186 includes a circular base 1861, a first boss 1862 protruding upward from an upper portion of the base 1861, and a second boss 1863 protruded downwardly from a bottom portion of the base 1861 which is opposite to the first boss 1862.

The first boss 1862 contacts the cover 173 made of the solid material to restrict an upward moving distance of the clamper 180, when the movable member 186 is moved upward. The second boss 1863 is engaged to the turntable 130 to fix the disk D.

The first boss 1862 is less protruded from the base 1861 than the second boss 1863. This makes the upward moving direction of the clamper 180 as short as possible to prevent the clamper 180 from being spaced apart from the turntable 130 and to prevent release of the disk D when the external shock is applied.

The second boss 1863 is more protruded from the base 1861 than the first boss 1862. This makes a distance between the clamper 180 and the turntable 130 as long as possible, such that it prevents the clamper 180 from being spaced apart from the turntable 130 when the external shock is applied.

The elastic member 185 is inserted into the guide portion 182, and is installed on a bottom portion of the movable member 186, so as to elastically bias the movable member 186 upward. Consequently, even though the movable member 186 is downwardly moved, the movable member 186 can be returned to its original position by the biasing force of the elastic member 185. The elastic member 185 is illustrated as having a cylindrical shape, but the embodiments of the present invention are not limited to this shape. Various modifications can be provided within the scope of the present invention.

The stationary member 187 closes the upper surface of the guide portion 182 to prevent the movable member 186 from being released from the guide portion 182. The stationary member 187 is formed with a plurality of through holes 1871 arranged along an edge thereof at regular intervals. The stoppers 184 formed on the upper surface of the guide portion 182 are inserted into the through holes 1871, so that the stationary member 187 is secured to the upper surface of the guide portion 182.

The stationary member 187 is formed with an opening 1872 through which the first boss 1862 passes to move up and down. The elastic member 185 and the body 181 are formed with an opening 1851 and the through hole 183, respectively, through which the second boss 1863 passes to move up and down.

The movable member 186 is made of a material which is attracted by a magnetic force. When the tray 160 is inserted into the main frame 110 and the clamper 180 approaches the turntable 130, the movable member 186 is attracted toward the turntable 130 by a magnet 131 (FIG. 6) provided on the turntable 130, and the clamper 180 is engaged to the turntable 130 by the magnetic force.

The operation of the clamper according to a first embodiment of the present invention with regard to fixing the disk D will now be described with reference to the accompanying drawings.

Figure 6:
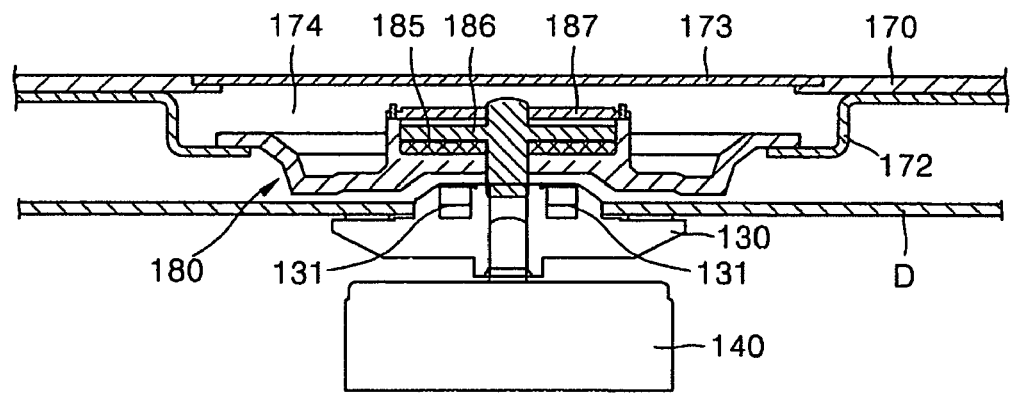
FIG. 6 is a cross-sectional view illustrating a clamper according to the first embodiment of the present invention approaching a turntable to secure a disk.
Figure 7:
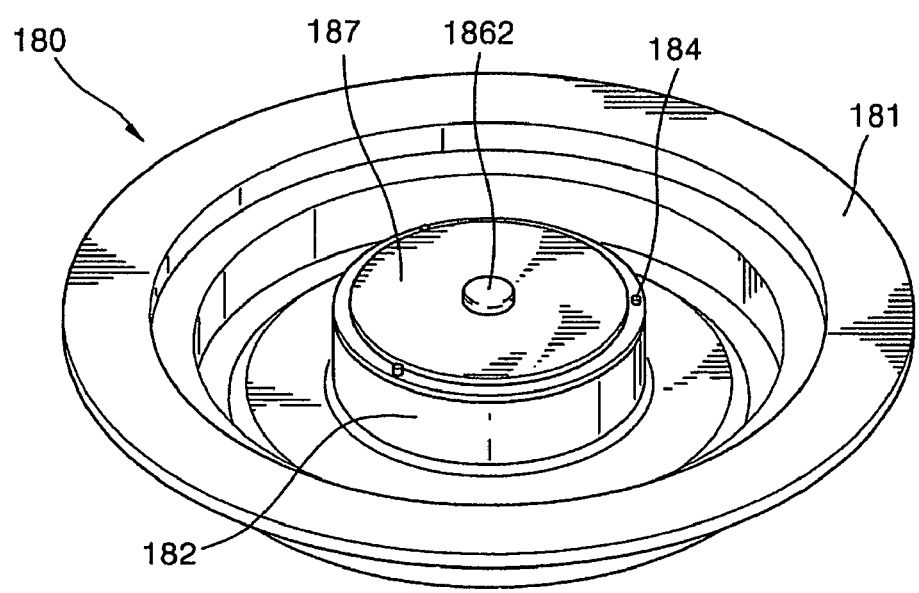
FIG. 7 is a perspective view illustrating the position of a movable member when the clamper according to the first embodiment of the present invention approaches the turntable to secure the disk.

FIG. 6 is a cross-sectional view illustrating the clamper 180 according to the first embodiment of the present invention approaching the turntable 130 to secure the disk D, and FIG. 7 is a perspective view illustrating the position of the movable member 186 when the clamper 180 approaches the turntable 130 to secure the disk D.

Referring to FIGS. 3, 6 and 7, when the tray 160 is inserted into the main frame 110, the sub-chassis 120 is moved upward, and the turntable 130 approaches the bottom surface of the disk D. The movable member 186 is attracted toward the turntable 130 by the magnet 131. At that time, the movable member 186 is moved downwardly to press the elastic member 185. The first boss 1862 is moved toward the bottom of the stationary member 187 through the opening 1872.

Figure 8:
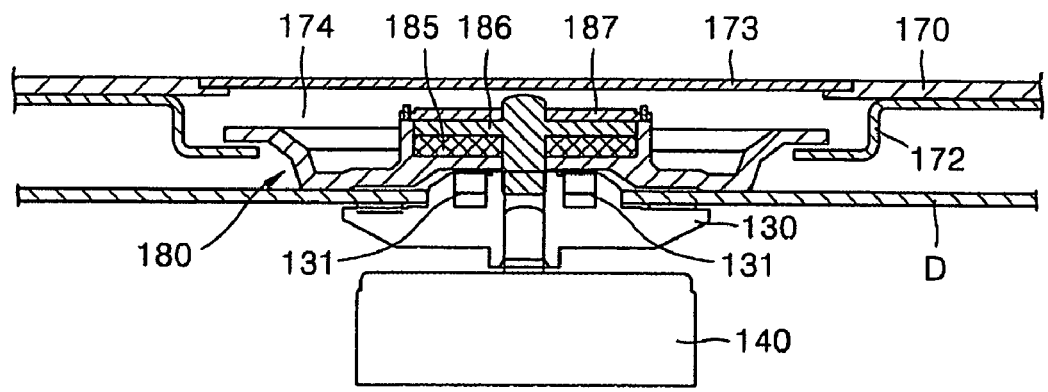
FIG. 8 is a cross-sectional view illustrating the disk clamped to the turntable by the clamper according to the first embodiment of the present invention.
Figure 9:
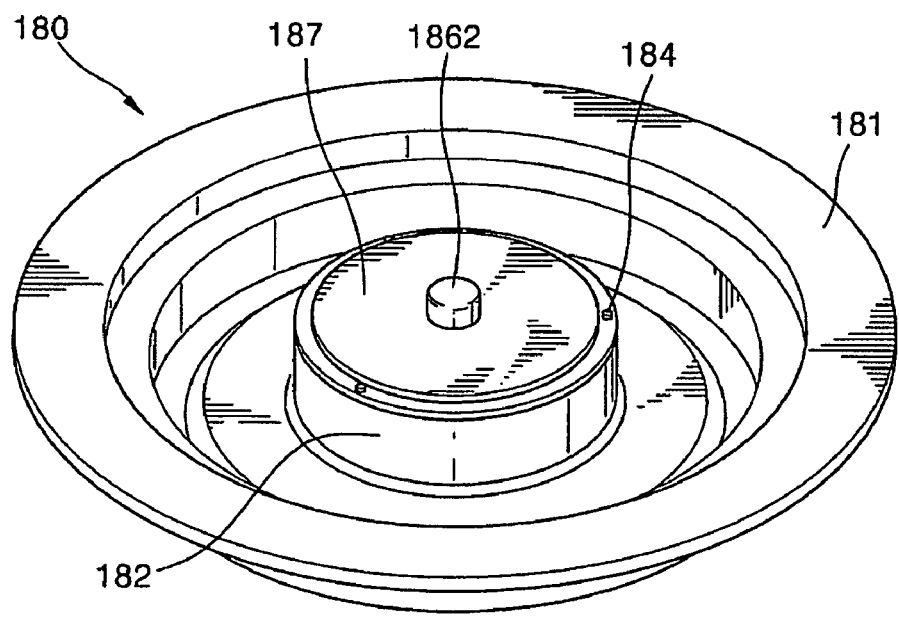
FIG. 9 is a perspective view illustrating the position of a movable member when the clamper according to the first embodiment of the present invention is coupled to the turntable.

FIG. 8 is a cross-sectional view illustrating the disk D clamped to the turntable 130 by the clamper 180 according to the first embodiment of the present invention, and FIG. 9 is a perspective view illustrating the position of the movable member 180 when the clamper 180 is coupled to the turntable 130.

Referring to FIGS. 8 and 9, when the clamper 180 is in contact with the turntable 130 due to the magnet 131, the disk D is interposed between the clamper 180 and the turntable 130.

At this time, the elastic member 185 elastically biases the movable member 186 upward to its original position using its stored elastic force. Consequently, the first boss 1862 is slightly moved upward toward the stationary member 187.

As the spindle motor 140 rotates, the turntable 130 rotates, and the optical pickup unit 150 moves linearly in the radial direction of the disk D to read the data from the disk D or write the data on the disk.

Figure 10:
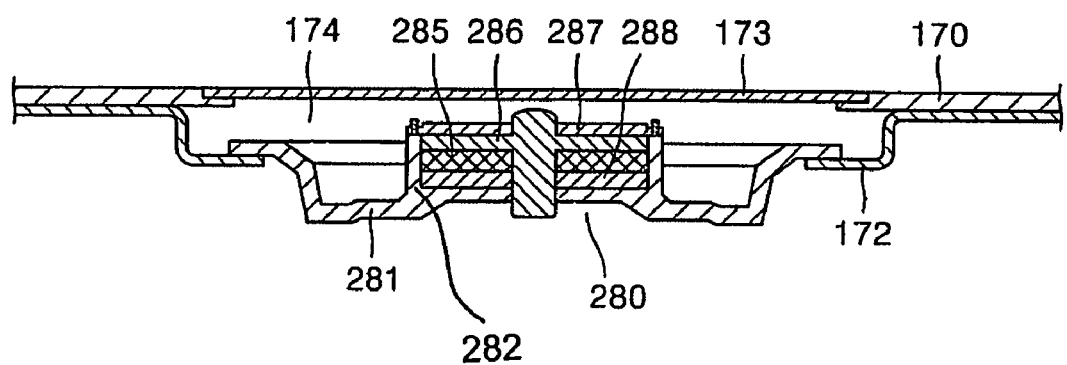
FIG. 10 is a cross-sectional view illustrating a damper according to a second embodiment of the present invention.

FIG. 10 is a cross-sectional view illustrating a clamper 280 according to a second embodiment of the present invention.

Referring to FIG. 10, the clamper 280 is similar to the clamper 180 according to the first embodiment of the present invention, except that a bracket 288 made of a magnetic material is further installed under an elastic member 285.

According to the clamper 280 of the second embodiment of the present invention, the bracket 288, the elastic member 285, and a movable member 286 are inserted into a guide portion 282 of a body 281 in order. A stationary member 287 is installed to the upper portion of the guide portion 282, which prevents the movable member 286 from being released from the guide portion 282.

It is not necessary for the movable member 286 to be magnetic. Since the bracket 288 is made of the material to be attracted by the magnetic force, the clamper 280 can be attracted to the turntable 130 by the magnet 131.

As described above, a clamper according to the embodiments of the present invention can adjust a gap between the upper case and the clamper to prevent a disk from being released from the turntable.

While the present invention has been particularly shown and described with reference to exemplary embodiments depicted in the drawings, it will be understood by those of ordinary skill in the art that various changes and modifications in form and details may be made therein without departing from the spirit and scope of the present invention.

What is claimed is:

1. A clamper to secure a disk in a disk drive including an upper case, a support frame provided under the upper case to move up and down, and a turntable to couple the clamper, the clamper comprising:
    a body;
    a guide portion protruding from the body;
    a movable member inserted into the guide portion to be movable up and down along the guide portion, and having a plurality of opposed bosses;
    an elastic member, inserted into the guide portion under the movable member, to elastically bias the movable member upward; and
    a stationary member, installed on an upper portion of the guide portion, to prevent the movable member from being released from the guide portion.

2. The clamper of claim 1, wherein the plurality of bosses comprises:
    a first boss protruding upward from an upper portion of the movable member to pass through the stationary member; and
    a second boss protruding downwardly from a bottom portion of the movable member to pass through the elastic member and the body,
    wherein the first boss has a length shorter than a length of the second boss, and the first boss restricts a moving distance of the movable member along the guide portion.

3. The clamper of claim 2, wherein the movable member further comprises a base comprising the upper portion and the bottom portion.

4. The clamper of claim 1, wherein the guide portion comprises an upper portion and a plurality of stoppers on the upper portion, the stationary member comprises a plurality of holes to respectively receive the stoppers, and the stationary member is secured to the upper portion of the guide portion by the stoppers.

5. The clamper of claim 1, wherein the movable member is made of a material which is attracted by a magnetic force.

6. The clamper of claim 1, further comprising a bracket inserted into the guide portion and made of a magnetic material.

7. A disk drive comprising:
    a main frame;
    a tray received by the main frame and accommodating a disk;
    a turntable, the disk being mountable thereon;
    a spindle motor to turn the turntable;
    an optical pickup unit movable along the disk; and
    a clamper to couple to the turntable to the disk, the clamper comprising:
        a body,
        a guide portion protruding from the body,
        a movable member inserted into the guide portion to be movable up and down along the guide portion, and having a plurality of opposed bosses,
        an elastic member, inserted into the guide portion under the movable member, to elastically bias the movable member upward, and
        a stationary member, installed on an upper portion of the guide portion, to prevent the movable member from being released from the guide portion.

8. The disk drive of claim 7, wherein the plurality of bosses comprises:
    a first boss protruding upward from an upper portion of the movable member to pass through the stationary member; and
    a second boss protruding downwardly from a bottom portion of the movable member to pass through the elastic member and the body,
    wherein the first boss has a length shorter than a length of the second boss, and the first boss restricts a moving distance of the movable member along the guide portion.

9. The disk drive of claim 8, wherein the second boss engages the turntable to secure the disk.

10. The disk drive of claim 8, wherein a length of the second boss is sufficient to prevent the clamper from being spaced apart from the turntable when an external shock is applied.

11. The disk drive of claim 7, wherein the guide portion comprises an upper portion and a plurality of stoppers on the upper portion, the stationary member comprises a plurality of holes to respectively receive the stoppers, and the stationary member is secured to the upper portion of the guide portion by the stoppers.

12. The disk drive of claim 7, wherein the movable member is made of a magnetic material.

13. The disk drive of claim 7, further comprising a bracket inserted into the guide portion and made of a magnetic material.

14. The disk drive of claim 13, wherein the clamper is formed of a non-magnetic material.

15. The disk drive of claim 7, wherein the body comprises a through hole and the guide portion is around the through hole.

16. A disk drive comprising:
- a turntable;
- a cover to cover the turntable; and
- a clamper to secure a disk to the turntable and maintain a distance relative to the cover so that the disk remains secured to the turntable when an external shock is received, wherein the clamper comprises a base having a disc shape and being substantially parallel to the cover, and a boss extending above the disc-shaped base towards the cover, wherein the clamper further comprises an elastic member to bias the base away from the disk during the external shock.

\* \* \* \* \*

UNITED STATES PATENT AND TRADEMARK OFFICE
CERTIFICATE OF CORRECTION

PATENT NO.         : 7,478,412 B2
APPLICATION NO. : 11/083339
DATED              : January 13, 2009
INVENTOR(S)        : Young-woo Huh et al.

It is certified that error appears in the above-identified patent and that said Letters Patent is hereby corrected as shown below:

Title Page, item (75), Line 4, change "Sung-huh" to --Sung-hun--.

On the Title Page item (57), Line 1, change "damper" to --clamper-- (in both occurrences).

Signed and Sealed this

Twenty-fourth Day of March, 2009

JOHN DOLL
*Acting Director of the United States Patent and Trademark Office*